United States Patent
Panda et al.

(10) Patent No.: US 7,809,351 B1
(45) Date of Patent: Oct. 5, 2010

(54) METHODS AND SYSTEMS FOR DIFFERENTIAL BILLING OF SERVICES USED DURING A MOBILE DATA SERVICE SESSION

(75) Inventors: Biswaranjan Panda, Santa Clara, CA (US); Jayaraman Iyer, Sunnyvale, CA (US); Weimin Ma, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 633 days.

(21) Appl. No.: 11/414,408

(22) Filed: Apr. 28, 2006

(51) Int. Cl.
*H04M 11/00* (2006.01)

(52) U.S. Cl. ............... 455/406; 455/410; 455/456.1; 455/411; 455/414.1; 455/466; 455/407

(58) Field of Classification Search ............ 455/466, 455/406, 414.4, 408, 456.1, 414.3, 414.2, 455/414.1, 407, 410, 457, 411, 422.1, 426, 455/428; 705/14, 28.26
See application file for complete search history.

(56) References Cited

U.S. PATENT DOCUMENTS

| | | | |
|---|---|---|---|
| 7,406,436 B1 * | 7/2008 | Reisman | 705/10 |
| 2003/0109265 A1 * | 6/2003 | Yamamoto et al. | 455/456 |
| 2004/0102182 A1 * | 5/2004 | Reith et al. | 455/410 |
| 2004/0192339 A1 * | 9/2004 | Wilson et al. | 455/456.1 |
| 2004/0203710 A1 * | 10/2004 | Gabor et al. | 455/422.1 |
| 2004/0203901 A1 * | 10/2004 | Wilson et al. | 455/456.1 |
| 2004/0203902 A1 * | 10/2004 | Wilson et al. | 455/456.1 |
| 2004/0203903 A1 * | 10/2004 | Wilson et al. | 455/456.1 |
| 2004/0235451 A1 * | 11/2004 | Whewell et al. | 455/406 |
| 2004/0235493 A1 * | 11/2004 | Ekerborn | 455/456.1 |

* cited by examiner

*Primary Examiner*—Rafael Pérez-Gutiérrez
*Assistant Examiner*—Joseph Arevalo
(74) *Attorney, Agent, or Firm*—Stolowitz Ford Cowger LLP

(57) ABSTRACT

Methods and systems for differential billing of services used during a mobile data service user session are disclosed. A method includes identifying a mobile data service user session and identifying a mobile data service user that is associated with the identified mobile data service user session. One or more services used by the mobile data service user during the mobile data service user session are identified. A service usage report is generated for each of the one or more services used by the mobile data service user. The usage reports are based on a measure of service usage of each of the identified one or more services and a billing profile that is associated with the user. Access is provided to the user service usage reports for storage as a part of billing records.

19 Claims, 6 Drawing Sheets

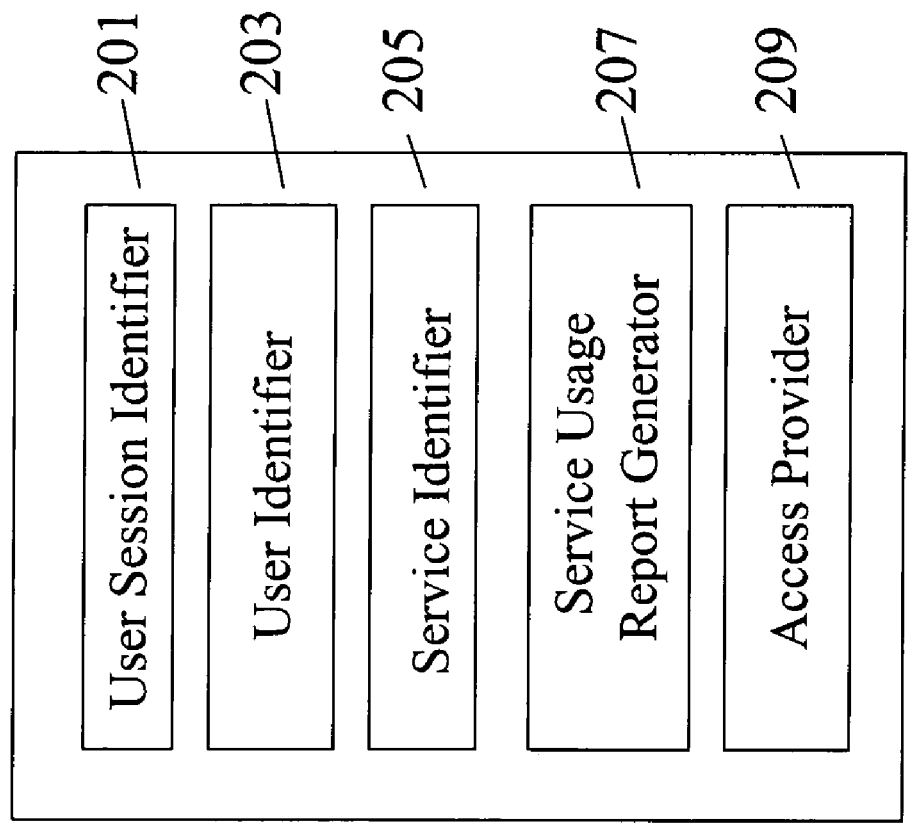

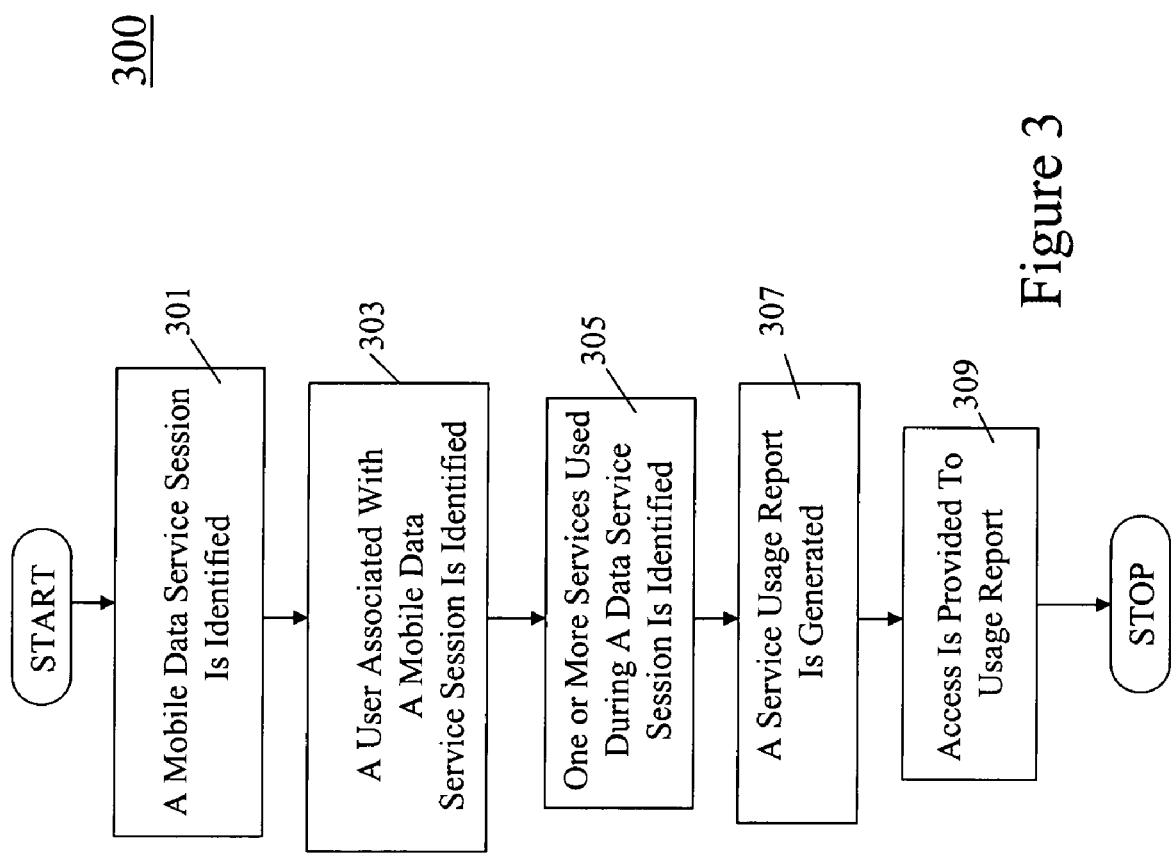

METHODS AND SYSTEMS FOR DIFFERENTIAL BILLING OF SERVICES USED DURING A MOBILE DATA SERVICE SESSION

TECHNICAL FIELD

Embodiments of the present invention pertain to methods and systems for differential billing of services used during a mobile data service session.

BACKGROUND ART

The Internet facilitates the access of resources that are available on the world-wide-web. Many different types of services are available that provide access to the Internet. These services provide access to the Internet via various devices such as computers, mobile phones, etc. Mobile data services provide access to the Internet via mobile phones.

Mobile data services facilitate the access of Internet resources by mobile data service customers. Internet based resources that can be accessed by mobile data service customers via mobile data services include services such as world-wide-web services, email, VoIP, text messaging, etc. Mobile data services charge for the use of the services that they provide to mobile data service users.

Mobile data service providers maintain billing systems that allow the mobile data service providers to charge customers for the mobile data services that they use. The systems that facilitate customer billing are maintained by the mobile data service and can be accessed by authorized requestors. Conventional mobile data services maintain systems for compiling billing records for their customers.

General Packet Radio Service/Universal Mobile Telecommunications System (GPRS/UMTS) is a mobile data service that is available to users of GSM mobile phones. In GPRS/UMTS networks, a gateway support node (e.g., GGSN) generates billing records called Call Detail Records (G-CDRs). The G-CDR contains the usage information for various events for a specific PDP context of the user. A user can do multiple different services on the same packet data protocol (PDP) contexts. However, with standard G-CDR there is no way to do differential billing for the services since it does not have any service specific information in it.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 shows components of a system for differential billing of services (SDBS) used during a mobile data service user session according to one embodiment of the present invention.

FIG. 3 shows a flowchart of the steps in a method for differential billing of services (SDBS) used during a mobile data service user session according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1A:
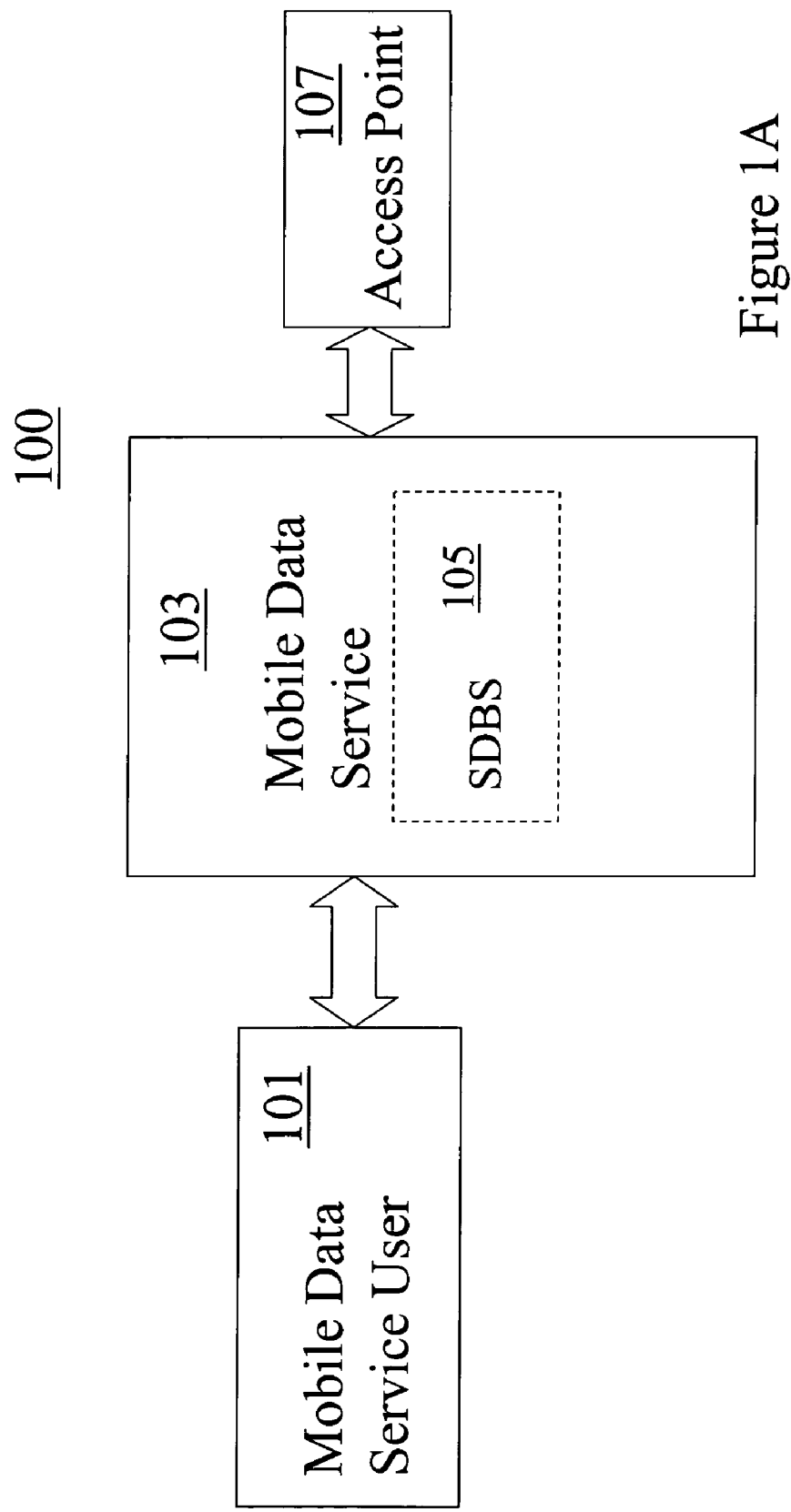
FIG. 1A shows an exemplary network setting of a system for differential billing of services used during a mobile data service session (SDBS) according to one embodiment of the present invention.

Network Setting of System for Differential Billing of Services Used During a Mobile Data Service Session According to Embodiments of the Present Invention FIG. 1A shows an exemplary network setting 100 of a system for differential billing of services used during a mobile data service session (SDBS) according to one embodiment of the present invention. In one embodiment, SDBS 105 accommodates a fine-grained accounting of mobile data service usage by providing an accounting of each of the services used during a mobile data service session. FIG. 1A shows mobile data service user 101, mobile data service 103, SDBS 105 and access point 107.

Referring to FIG. 1A, mobile data service user 101 uses a mobile data telecommunications device (e.g., mobile telephone) to initiate, facilitate and terminate a mobile data service session. In one embodiment, during a mobile data service session one or more services can be solicited and used by mobile data service user 101. It should be appreciated that service specific parameters can be used to determine service usage of specific services by a mobile data service user 101. In one embodiment, these parameters correspond to layers 4-7 of the open systems interconnect (OSI) model. In other embodiments, these parameters can include other services.

In one embodiment, the aforementioned service specific parameters that can be used to determine usage of specific services can include but are not limited to service specific identifiers, charging status to indicate pre-paid or post-paid user status, time of first usage and time of last usage, time based usage, uplink and downlink volume usage, negotiated QoS, SGSN IP address, PLMN identifier, reason for the usage report.

Mobile data service 103 facilitates the access by mobile data service user 101 of access point 107. In one embodiment, access point 107 is an IP network to which a mobile device can be connected. In one embodiment, mobile data service 103 can be operated under the control of a service provider.

In one embodiment, mobile data service 103 can include one or more support nodes. Moreover, these support nodes can be implemented using a data relay device (e.g., routers, switches, etc.).

Figure 1B:
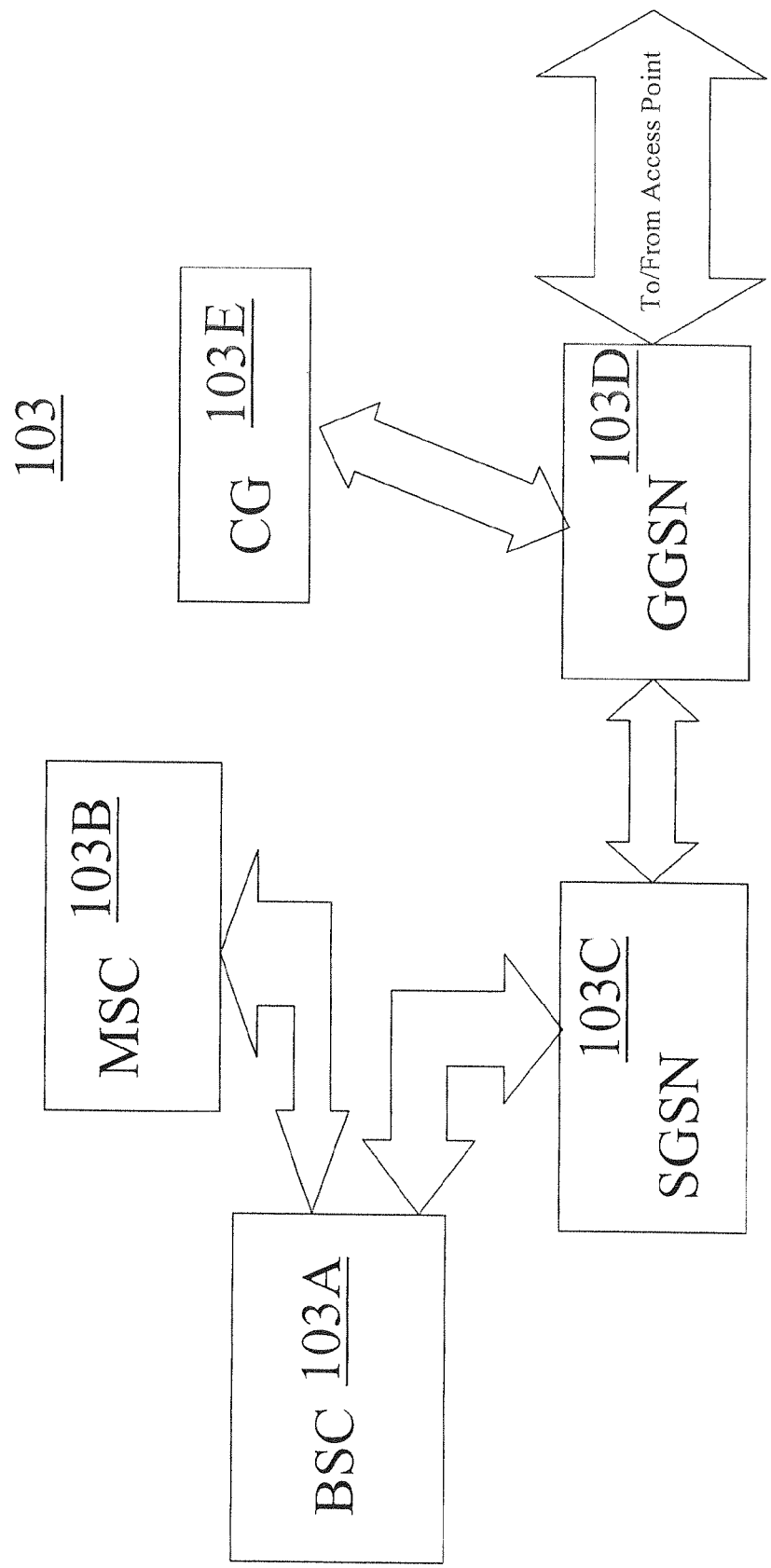
FIG. 1B shows exemplary components of a mobile data service according to one embodiment of the present invention.

FIG. 1B shows exemplary nodes (e.g., components) of a mobile data service 103 according to one embodiment of the present invention. It should be appreciated that the components of mobile data service 103 shown in FIG. 1B are exemplary of one embodiment of the present invention. However other components can be used in other embodiments. In the FIG. 1B embodiment, mobile data service 103 includes base station controller (BSC) 103A, mobile switching center (MSC) 103B, serving support nodes (SGSN) 103C, gateway support nodes (GGSN) 103D, and charging gateway (CG) 103E.

Referring to FIG. 1B, BSC 103A is the base station control system that manages base station operations that connect mobile data service users 101 to mobile data service 103. BSC 103A handles allocation of radio channels, receives measurements from mobile phones and controls handovers.

MSC 103B is a telephone exchange that provides circuit-switched calling, mobility management, and global system for mobile communications (GSM) services to mobile data service users 101 as mobile data service users 101 roam within the area that it serves.

SGSN 103C decides which GGSN is to be used for a particular mobile data service session. SGSN 103C carries out uplink and downlink functions and provides mobility management as mobile data service user 101 moves from routing area to routing area.

GGSN 103D generates billing records for mobile data service sessions. In one embodiment, GGSN 103D is the component of mobile data service 103 where SDBS 105 actually resides. In other embodiments, SDBS 105 can be separate from but operate cooperatively with GGSN 103D. GGSN 103D provides an interface between mobile data service 103 and other networks such as the Internet or private networks.

In one embodiment, CG 103E receives billing information from mobile data service GGSN 103D. In one embodiment, for pre-paid users, GGSN 103D communicates with CG 103E for quota authorization and usage reporting. In one embodiment, the various triggers and thresholds for generating the aforementioned service usage reports are obtained from the CG 103E. In one embodiment, there can be a billing records closure criteria maintained by CG 103E that is based on a specific number of service records.

Referring again to FIG. 1A, SDBS 105 accommodates a fine-grained differential billing of services used by mobile data service user 101 during mobile data service sessions. SBDS 105 directs the compilation of service usage reports for each of the services used by mobile data service user 101 during a mobile data service session as is describe herein in detail. In one embodiment, the service usage reports can be maintained in the aforementioned billing records generated by GGSN 103D.

Operation

In operation, service user 101 initiates a mobile data service session using a mobile telecommunications device. Upon initiation of the mobile service session and being connected to an access point 107 via mobile data service 103, a monitoring of the mobile data service session is begun. When the mobile data service session is terminated, an accounting of service usage by mobile data service user 101 is made for billing purposes. As a part of the accounting, a service usage report for each of the services used by a service user 101 is made. These reports correspond to service specific parameters that are included in system billing records. From these service usage reports charges for a mobile service user based on differential billing can be determined.

Figure 1C:
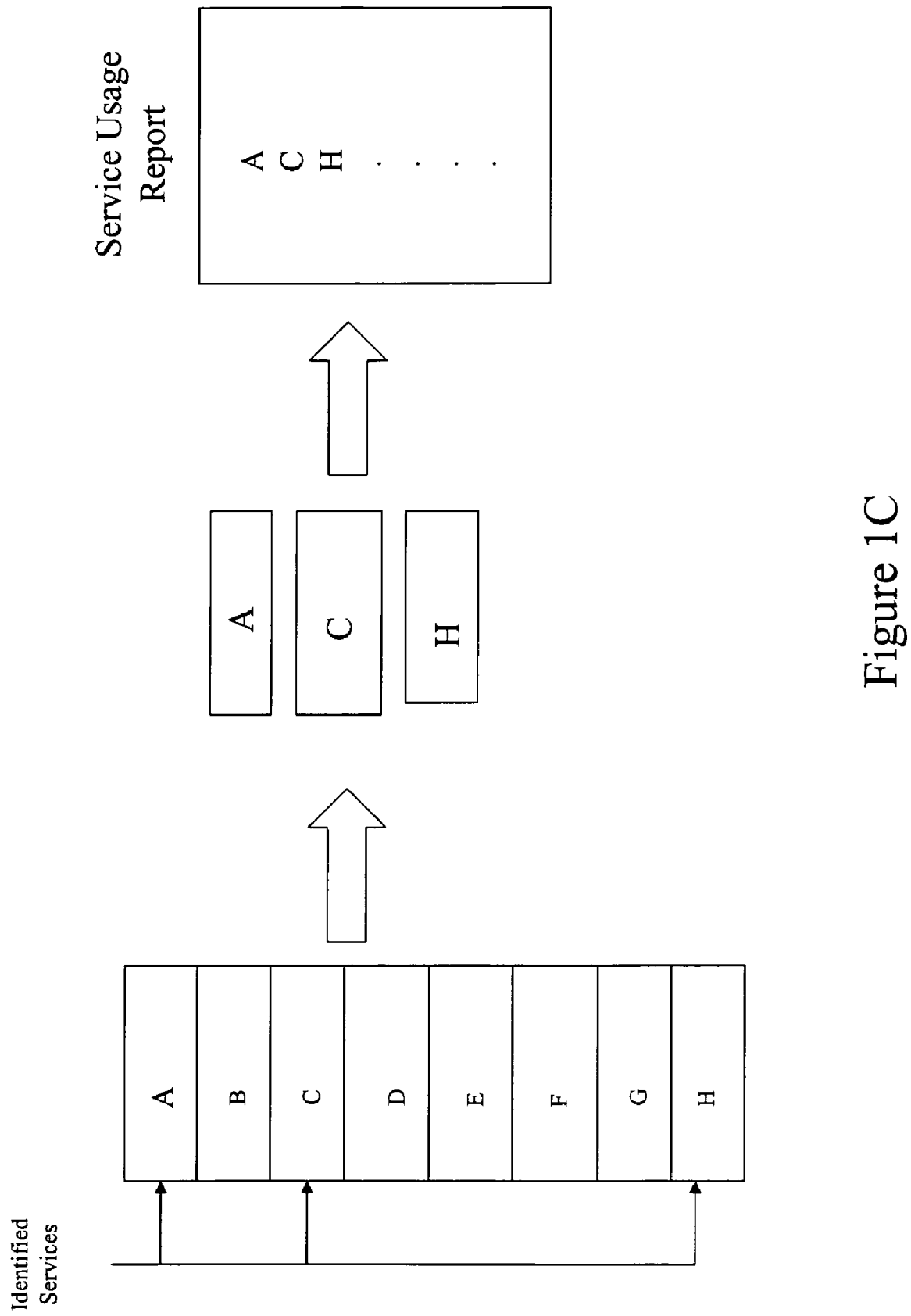
FIG. 1C illustrates the manner in which specific services that are used during a particular mobile data service session are identified according to one embodiment of the present invention.

In one embodiment, specific services (A, C and H) that are used during a particular mobile data service session are identified as is shown in FIG. 1C. As shown in FIG. 1C, after the services used during a service session are identified, the aforementioned service usage reports can be compiled. From the compiled reports the total charges for a mobile data service session can be determined.

In one embodiment, billing records also contain the usage information for various events that occur during a specific mobile data service session of a service user (e.g., 103). It should be appreciated that a mobile data service user (e.g., 103) can use many services during a single service session.

In exemplary embodiments, billing records are expanded to include the aforementioned service specific usage information. In one embodiment, it can include billing information relevant to both pre-paid and post-paid billing.

FIG. 2 shows components of a system 105 for differential billing of services (SDBS) used during a mobile data service user session according to one embodiment of the present invention. In the FIG. 2 embodiment, SDBS 105 includes user session detector 201, user identifier 203, service identifier 205, service usage report generator 207, access provider 209.

Referring to FIG. 2, user session identifier 201 identifies a mobile data service user session for billing purposes. In one embodiment, the mobile data service user session can involve the access of Internet resources using the mobile data service by a mobile data service user.

User identifier 203 identifies a user that is associated with an identified user session. In one embodiment, an identification of the particular user that is associated with an identified user session facilitates a determination of service specific parameters that are to be used in the billing process (e.g., proper charging profile etc.)

Service identifier 205 identifies one or more services used by a user during a mobile data service session. In one embodiment, identifying the one or more services that are used by a user facilitates differential billing which tracks charges for each of the services that are used by a user during a user session.

Service usage report generator 207 generates a service usage report for each of the identified one or more services used by the user during a mobile data service session. In one embodiment, a service usage report details the amount of each service of the identified one or more services that is used by a service user.

Access provider 209 provides access to mobile data service user service usage reports. In one embodiment, service usage reports can be used to determine session charges for a particular mobile data service session of a particular mobile data service user.

Exemplary Operations of Method for Differential
Billing of Services Used During a Mobile Data
Service Session According to Embodiments of the
Present Invention FIG. 3 shows a flowchart 300 of the steps in a method for differential billing of services (SDBS) used during a mobile data service user session according to one embodiment of the present invention. The flowchart includes processes of the present invention which, in one embodiment can be carried out by processors and electrical components under the control of computer-readable and computer-executable instructions.

Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 3, at step 301, a mobile data service user session is identified. In one embodiment, a session identifier (e.g., 201 in FIG. 2) can be employed to identify a mobile data service user session for billing purposes. In one embodiment, the mobile data service user session can involve the access of Internet resources by a mobile data service user using the mobile data service.

At step 303, a user associated with an identified mobile data service user session is identified. In one embodiment, a user identifier (e.g., 203 in FIG. 2) identifies a user that is associated with an identified user session. In one embodiment, an identification of the particular user that is associated with an identified user session facilitates a determination of certain service specific parameters that are to be used in the billing process (e.g., proper charging profile etc.)

At step 305, one or more services used by a user during a mobile data service session are identified. In one embodiment, a service identifier (e.g., 205 in FIG. 2) can be used to identify one or more services used by a user during a mobile data service session. In one embodiment, identifying the one or more services that are used by a user facilitates differential billing which tracks charges for each of the services that are used by a user during a user session.

At step 307, a service usage report is generated for each of the identified one or more services used during a mobile data service session. In one embodiment, a service usage report generator (e.g., 207 in FIG. 2) generates a service usage report for each of the identified one or more services used by the user during a mobile data service session. In one embodiment, a service usage report details the charges for each service of the identified one or more services that is used by a service user.

At step 309, access to service user service usage reports are provided. In one embodiment, an access provider (e.g., 209 in FIG. 2) can be used to provide access to service user service usage reports. In one embodiment, service usage reports can be used to determine session charges for a particular mobile data service session of a particular mobile data service user.

Exemplary Hardware in Accordance with
Embodiments of the Present Invention

Figure 4:
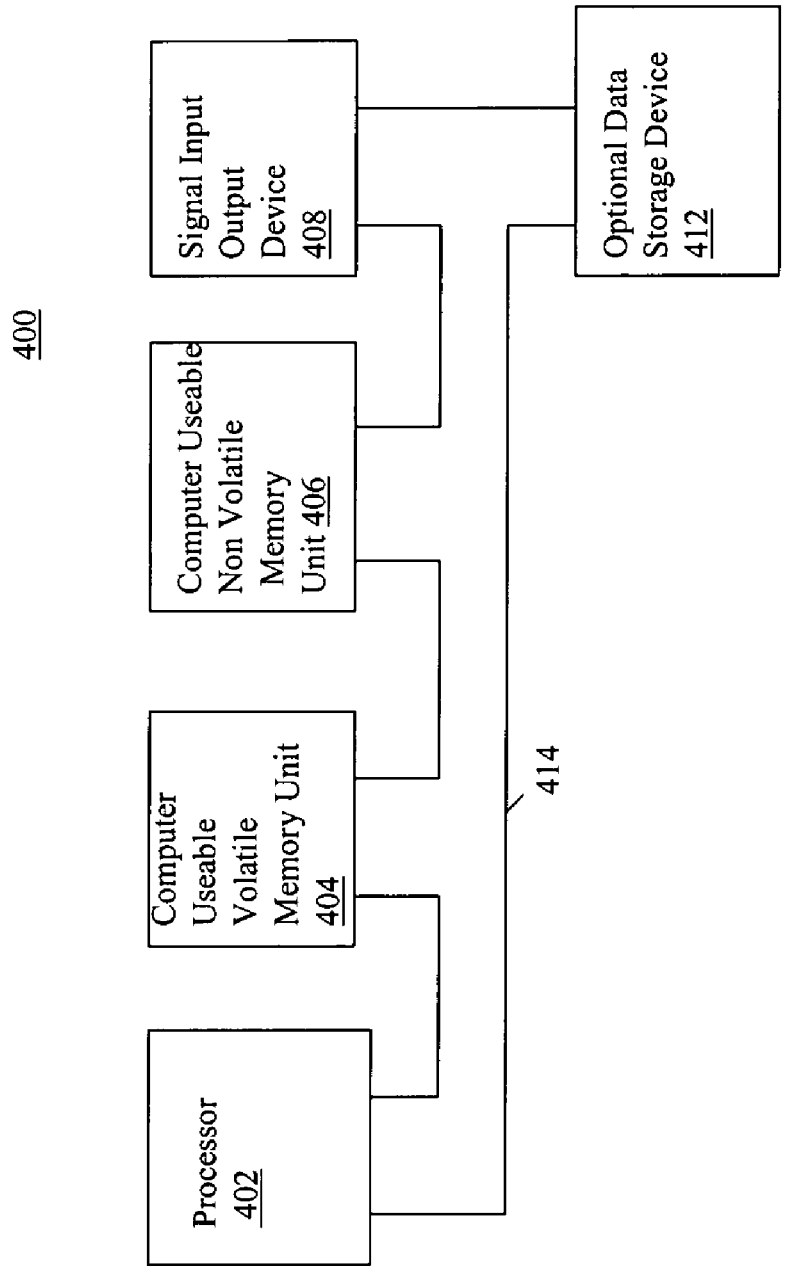
FIG. 4 is a block diagram of an exemplary computer system 400 in accordance with embodiments of the present invention.

FIG. 4 is a block diagram of an exemplary computer system 400 in accordance with embodiments of the present invention. System 400 may be well suited to be any type of electronic computing device (e.g., server computer, embedded computing device, portable computing system etc.). Within the following discussions herein, certain processes and steps are discussed that are realized, in some embodiments, as a series of instructions (e.g., software program) that reside within computer readable memory units of computer system 400 and executed by a processor(s) of system 400. When executed, the instructions cause computer 400 to perform specific actions and exhibit specific behavior which is described in detail below. According to one embodiment, the instructions may include code that when executed perform the method for differential billing of services (SDBS) used during a mobile data service user session described herein.

Computer system 400 of FIG. 4 comprises an address/data bus 414 for communicating information, one or more central processors 402 coupled with bus 414 for processing information and instructions. Central processor unit 402 may be a microprocessor or any other type of processor. The computer 400 also includes data storage features such as a computer usable volatile memory unit 404 (e.g., random access memory, static RAM, dynamic RAM, etc.) coupled with bus 414 for storing information and instructions for central processor(s) 402, a computer usable non-volatile memory unit 406 (e.g., read only memory, programmable ROM, flash memory, EPROM, EEPROM, etc.) coupled with bus 414 for storing static information and instructions for processor(s) 402. System 400 also includes one or more signal generating and receiving devices 408 coupled with bus 414 for enabling system 400 to interface with other electronic devices. The communication interface(s) 408 of the present embodiment may include wired and/or wireless communication technology such as a wireless telephone circuitry. For example, in some embodiments, the communication interface 408 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 400 may also include a computer usable mass data storage device 412 such as a magnetic or optical disk and disk drive (e.g., hard drive or floppy diskette) coupled with bus 414 for storing information and instructions.

In accordance with exemplary embodiments thereof, methods and systems for differential billing of services used during a mobile data service user session are disclosed. A method includes identifying a mobile data service user session and identifying a mobile data service user that is associated with the identified mobile data service user session. One or more services used by the mobile data service user during the mobile data service user session are identified. A service usage report is generated for each of the one or more services used by the mobile data service user. The usage reports are based on a measure of service usage of each of the identified one or more services and a billing profile that is associated with the user. Access is provided to the user service usage reports for storage as a part of billing records.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for differential billing of services used during a mobile data service user session, comprising:
    identifying a user session;
    identifying a user profile that is associated with said user session;
    identifying a plurality of service parameters of said user session, wherein said plurality of service parameters correspond to one or more of Open Systems Interconnect (OSI) layers 4 through 7;
    identifying a plurality of different types of services associated with said plurality of service parameters, wherein each of said different types of services is identified by a different one of said plurality of service parameters, wherein said plurality of different types of services are provided during said user session, wherein said plurality of different types of services are provided on a General Packet Radio Service/Universal Mobile Telecommunication System (GPRS/UMTS) network, and wherein said plurality of different types of services utilize a same packet data protocol of said GPRS/UMTS network;

accessing an online charging server to obtain triggers and thresholds for generating a plurality of service-level usage reports;

generating a service usage report for each of said plurality of different types of services, wherein said service usage report is generated at a gateway support node located within said GPRS/UMTS network, wherein said service usage report comprises a billing rate that is based on both said user profile and at least one of said plurality of service parameters, and wherein said plurality of different types of services are associated with different billing rates;

providing access to said service usage report for storage as a part of billing records, wherein said billing records comprise a plurality of service usage reports associated with said user profile; and compiling said plurality of service usage reports to determine a total charge associated with said user session.

2. The method of claim 1, further comprising accessing an online charging server for quota authorization and usage reporting.

3. The method of claim 1, wherein said one or more service parameters comprise post-paid services and pre-paid services, and wherein a billing rate associated with both said post-paid services and said user profile is different than a billing rate associated with both said pre-paid services and said user profile.

4. The method of claim 1, wherein said plurality of different types of services comprises Voice over Internet Protocol (VoIP) services and email services, and wherein a billing rate associated with said VoIP services is different than a billing rate for said email services.

5. The method of claim 1, wherein said plurality of different types of services comprises world-wide-web (WWW) services and email services, and wherein a billing rate associated with said WWW services is different than a billing rate for said email services.

6. An apparatus, comprising:
a computer readable memory unit;
one or more processors coupled to said memory unit, said one or more processors for executing a method for differential billing of services used during a mobile data service user session, comprising:
identifying a user session;
identifying a user profile that is associated with said user session;
identifying a plurality of service parameters of said user session;
identifying a plurality of different types of mobile Internet data services associated with said plurality of service parameters, wherein each of said different types of mobile Internet data services is identified by a different one of said plurality of service parameters, wherein said plurality of different types of mobile Internet data services are provided on a General Packet Radio Service/ Universal Mobile Telecommunication System (GPRS/UMTS) network, and wherein said plurality of different types of mobile Internet data services are provided using a specific data protocol of said GPRS/UMTS network;

accessing an online charging server to obtain triggers and thresholds for generating a plurality of service usage reports;

generating a service usage report for each of said plurality of different types of mobile Internet data services, wherein said service usage report is generated at a gateway support node of said GPRS/UMTS network, wherein said service usage report comprises a billing rate that is based on both said user profile and at least one of said plurality of service parameters, and wherein said plurality of different types of mobile Internet data services are associated with different billing rates; and determining a total charge for said user profile, wherein said total charge is determined by compiling said plurality of service usage reports associated with said plurality of different types of mobile Internet data services.

7. The apparatus of claim 6, wherein said plurality of service parameters comprises a post-paid service and a pre-paid service, and wherein a billing rate associated with a service usage report for said post-paid service is different than a billing rate associated with a service usage report for said pre-paid service.

8. The apparatus of claim 6, further comprising:
providing access to said service usage report for storage as a part of billing records, wherein said billing records comprise a plurality of service usage reports associated with said user profile, and wherein said billing records contain service based billing parameters that indicate said plurality of different types of mobile Internet data services that are to be billed.

9. The apparatus of claim 8, wherein said billing records contain closure criteria based on a specific number of service records.

10. The apparatus of claim 8, wherein said billing records are a part of a Gateway Call Detail Record (G-CDR) structure, wherein said G-CDR structure comprises usage information associated with said specific data protocol of said GPRS/UMTS network.

11. The apparatus of claim 6, wherein said plurality of different types of mobile Internet data services comprises Voice over Internet Protocol (VoIP) services and world-wide-web (WWW) services, and wherein a billing rate associated with said VoIP services is different than a billing rate for said WWW services.

12. The apparatus of claim 6, wherein said plurality of different types of mobile Internet data services comprises Voice over Internet Protocol (VoIP) services and text messaging services, and wherein a billing rate associated with said VoIP services is different than a billing rate for said text messaging services.

13. The apparatus of claim 6, wherein said plurality of different types of mobile Internet data services comprises world-wide-web (WWW) services and text messaging services, and wherein a billing rate associated with said WWW services is different than a billing rate for said text messaging services.

14. The system of claim 6, wherein said plurality of service parameters corresponds to one or more of Open Systems Interconnect (OSI) layers 4 through 7.

15. A system for differential billing of services used during a mobile data service user session, comprising:
means for identifying a user session;
means for identifying a user profile associated with said user session;

means for identifying a plurality of service parameters for said user session;

means for identifying a plurality of services provided during said user session, wherein each of said plurality of services is associated with a different one of said plurality of service parameters, wherein said plurality of services are provided on a General Packet Radio Service/Universal Mobile Telecommunication System (GPRS/UMTS) network, and wherein said plurality of services are provided using a same data protocol of said GPRS/UMTS network;

means for accessing an online charging server to obtain triggers and thresholds for generating a plurality of service usage reports;

means for generating a service usage report for each of said plurality of services, wherein said service usage report comprises a billing rate that is based on both said user profile and at least one of said plurality of service parameters, and wherein said plurality of services are associated with different billing rates; and means for determining a total charge for said user profile, wherein said total charge is determined by compiling said plurality of service usage reports associated with said plurality of services provided during said user session.

16. The system of claim 15, further comprising:
providing access to said service usage report for storage as a part of billing records, wherein said billing records comprise a plurality of service usage reports associated with said user profile, wherein said billing records are a part of a Gateway Call Detail Record (G-CDR) structure, and wherein said G-CDR structure comprises usage information associated with said same data protocol.

17. The system of claim 15, wherein said plurality of service parameters comprises post-paid services and pre-paid services, and wherein a billing rate associated with both said post-paid services and said user profile is different than a billing rate associated with both said pre-paid services and said user profile.

18. The system of claim 15, wherein said plurality of services comprises world-wide-web (WWW) services, Voice over Internet Protocol (VoIP) services, and email services, and wherein different billing rates are associated with each of said WWW services, said VoIP services, and said email services.

19. The system of claim 15, wherein said service usage report is generated at a gateway support node of said GPRS/UMTS network.

\* \* \* \* \*

UNITED STATES PATENT AND TRADEMARK OFFICE
CERTIFICATE OF CORRECTION

| | | |
|---|---|---|
| PATENT NO. | : 7,809,351 B1 | Page 1 of 1 |
| APPLICATION NO. | : 11/414408 | |
| DATED | : October 5, 2010 | |
| INVENTOR(S) | : Biswaranjan Panda et al. | |

It is certified that error appears in the above-identified patent and that said Letters Patent is hereby corrected as shown below:

On column 8, line 59, CLAIM 14, after "The" delete "system" and insert -- apparatus --.

Signed and Sealed this
Tenth Day of April, 2012

David J. Kappos
*Director of the United States Patent and Trademark Office*